UNITED STATES PATENT OFFICE.

STEPAN BORECKY AND JOSEF KOMESTIK, OF PARDUBICE, AUSTRIA-HUNGARY.

ANTI-INCRUSTATION COMPOUND.

SPECIFICATION forming part of Letters Patent No. 583,023, dated May 25, 1897.

Application filed November 12, 1896. Serial No. 611,894. (No specimens.)

*To all whom it may concern:*

Be it known that we, STEPAN BORECKY and JOSEF KOMESTIK, residing at Pardubice, Kingdom of Bohemia, Empire of Austria-Hungary, have made certain new and useful Improvements in Anti-Incrustating Mixtures for Boilers, of which the following is a specification.

Our invention refers to improved means, especially appropriate fluids, for the prevention of hard incrustations in steam-boilers. We ourselves have prepared previous to this time a special fluid composed of calcined soda, olive-oil, oil-soot, lime-water, and of granulated zinc, which we thought would give the desired effect; but finding that the mixing in itself of such and the like ingredients does not suffice to produce the desired effect upon the incrustations or against them we point out the following way of preparing our anti-incrustating fluid:

Take eighty pounds of boiling water and dissolve in it thirty-five pounds of calcinated soda. Take, further, seven pounds of slaked lime, mix it thoroughly with one-half pound of fine oil-soot and so much water as to produce a thin pulp. Sift this through an appropriate sieve with openings of, say, about the fiftieth part of an inch wide. Then mix this sifted pulp with the above said solution when yet boiling, and add eighty pounds of cold water and decant into a clean vessel or cask. Thus nearly two hundred pounds of a liquid will be obtained, to which add one-half pound of pulverized zinc. Let it afterward lie for twenty-four hours. Then take five pounds of caustic slaked lime in form of a thin pulp, mix with it one pound of mineral oil, and sift like before. Further, add it to the above-mentioned two hundred pounds of liquid, mix the whole well through, let it stand about two hours, and decant into a clean vessel, cask, or the like. After having prepared this liquid we preferably add to it, first, a small quantity of tartaric acid, say about one-fourth to each one hundred pounds of the fluid, and, second, the decoction of about one-half a pound of tan to one hundred pounds of the fluid. This fluid has to be kept in open vessels till its transportation, and one should never forget to open the casks or barrels as soon as they arrive at their destination.

The liquid has to be mixed thoroughly before using. It has to be used in the following doses: For each ten square feet of heating-surface of the boiler take one pound of the liquid for the first week, the second week again so, and each following week take about two pounds, till the end of the firing. In case of day and night work take one-third more of it.

Sooner or later a fine sediment will form in the boiler and remains suspended in the water; but it never will form any incrustation upon the walls or sheets of the boiler, so that in any case it can easily be blown out. In case of old incrustations in the boiler after having used our anti-incrustating fluid for some weeks the crust will break off completely, and the sheets will never be damaged more than they were by the incrustation itself.

We claim—

1. Anti-incrustating fluid for steam-boilers, composed of water, calcined soda, oil-soot, pulverized zinc, caustic lime, mineral oil, tartaric acid and tannin, all prepared and used in the quantities and proportions and in the way substantially as set forth.

2. Anti-incrustating fluid for steam-boilers, composed of water calcined soda, oil-soot, pulverized zinc, caustic lime, and mineral oil in the proportions substantially as set forth.

In witness whereof we have hereunto set our hands in presence of two witnesses.

STEPAN BORECKY.
JOSEF KOMESTIK.

Witnesses:
L. HOJAEELZ,
ADOLPH FISCHER.